United States Patent [19]

Steimel et al.

[11] Patent Number: 4,717,823

[45] Date of Patent: Jan. 5, 1988

[54] DETECTOR DEVICE HAVING AN ARRAY OF DETECTOR ELEMENTS FOR SCANNING A FIELD OF VIEW

[75] Inventors: Johannes Steimel, Constance; Hans Kordulla; Hans Oppelt, both of Überlingen, all of Fed. Rep. of Germany

[73] Assignee: Bodenseewerk Gerätetechnik GmbH, Überlingen, Fed. Rep. of Germany

[21] Appl. No.: 828,433

[22] Filed: Feb. 10, 1986

[30] Foreign Application Priority Data

Feb. 15, 1985 [DE] Fed. Rep. of Germany ....... 3505198

[51] Int. Cl.$^4$ ............................................. G02B 26/10
[52] U.S. Cl. ...................... 250/236; 250/234; 350/6.4

[58] Field of Search ................ 250/234–236, 250/578, 203 R, 231 GY; 350/6.1–6.4, 484; 244/3.13, 3.16

[56] References Cited

U.S. PATENT DOCUMENTS 4,061,415 12/1977 Taenzer ................................. 350/6.3
4,407,464 10/1983 Linick .................................. 244/3.13

*Primary Examiner*—Edward P. Westin
*Attorney, Agent, or Firm*—Lee, Smith & Zickert

[57] ABSTRACT

In order to scan a rather large field of view quickly, the field of view is imaged, by an imaging optical system, in the plane of a detector having a substantially linear array of detector elements. The path of rays comprises a rotating optically refracting wedge for causing a nutating movement of the image and, coaxial therewith a rotating Dove prism for causing rotation of the image. The wedge and the Dove prism rotate at different rotary speeds.

11 Claims, 4 Drawing Figures

DETECTOR DEVICE HAVING AN ARRAY OF DETECTOR ELEMENTS FOR SCANNING A FIELD OF VIEW

TECHNICAL FIELD

The invention relates to a device for scanning a field of view by means of a detector having a substantially linear array of detector elements, and of an imaging scanning optical system means having movable optical elements, said optical system being adapted to form an image of the field of view in the plane of the detector and to move said image relative to the detector, wherein (a) said imaging and scanning optical system means comprises image rotating means which rotate about an axis of rotation at a first rotary speed and which are adapted to rotate the image of the field of view at twice this first rotary speed.

BACKGROUND ART

It is known to scn a field of view with a detector which consists of a linear array of detector elements by deflecting the path of rays by means of an oscillating mirror, the image of the field of view being moved transversely to the longitudinal axis of the detector. With such a device one dimension of the scanned field of view is limited by the length of the detector. The other dimension is limited by the characteristics of the lens. Therefore only rather small fields of view can be scanned in this manner.

Furthermore it is known to scan a field of view along a rosette-shaped path by means of one single detector. The imaging and scanning optical system comprises first and second image deflecting means, which rotate at different rotary speeds. Usually the image deflecting means are mirrors which are inclined to the axis of rotation or optically refracting, rotating wedges (U.S. Pat. Nos. 4,039,246; 4,009,393; European patent application 79,684; U.S. Pat. Nos. 4,030,807 and 4,413,177) or systems of trihedral mirrors (U.S. Pat. No. 3,927,254). With such a rosette scan it takes a rather long time until all points of a rather large field of view have been traversed by a rosette loop at least once and the field of view has been scanned with the required resolution.

U.S. Pat. No. 4,393,408 shows a detector comprising a linear array of detector elements in combination with image rotating means. These image rotating means are formed by a rotating afocal system consisting of two cylindrical optical elements, which rotate about an axis perpendicular to the plane of their generatrices, and an optical element for focusing on the array of detector elements. The diameter of the field of view which can be scanned with such a rotary scanning device is determined by the length of the detector. Thus also with this prior art scanning device only rather small fields of view can be scanned.

European patent application 130,778 shows a rotary scanning device wherein an imaging optical system forms a stationary image of a field of view in the plane of a rotatable base element. The rotatable base element carries a linear array of detector elements. The image is scanned by rotating the base element.

DISCLOSURE OF INVENTION

It is the object of the invention to quickly scan, by means of a detector consisting of a linear array of detector elements, a field of view which is large as compared with the area of the detector.

According to the invention this object is achieved in that (b) the imaging and scanning optical system means comprises rotating, image deflecting means for generating a nutating movement of the image of the field of view at a second rotary speed, and (c) said detector is arranged eccentric to said axis of rotation.

By the image rotating means and the detector located eccentric with respect to the axis of rotation, an annular area of the field of view is scanned during half a revolution of the image rotating means. Because of the rotating image deflecting means, the center of this annular area, at the same time describes a circular path. Thus a large field of view has been scanned with high resolution, after the image deflecting means have completed a full revolution.

Modifications of the invention have been claimed in the dependent claims.

BRIEF DESCRIPTION OF DRAWINGS

Two embodiments of the invention are described in greater detail hereinbelow with reference to the accompanying drawings.

BEST MODE OF CARRYING OUT THE INVENTION

Figure 1:
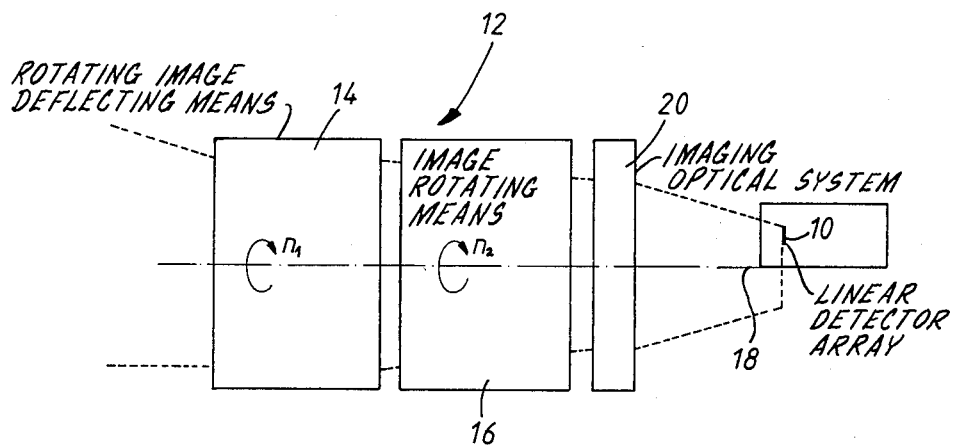
FIG. 1 is a schematic illustration of a device for scanning a field of view.
Figure 2:
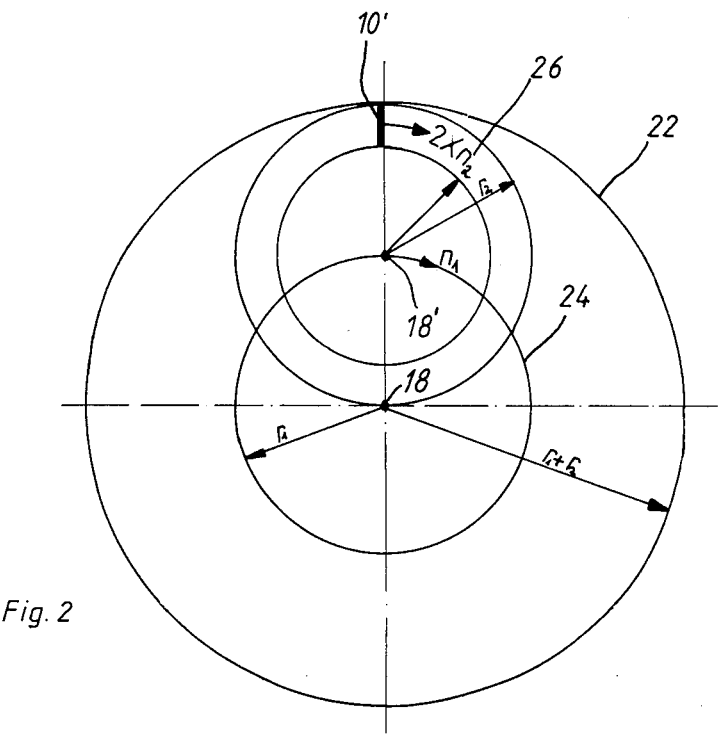
FIG. 2 illustrates the scanning of the field of view by means of a detector comprising a substantially linear array of detector elements.

The device for scanning a field of view comprises a detector 10 with a substantially linear array of detector elements. In FIG. 2 this detector is schematically shown as a thick straight line. Such detectors are known per se, and therefore the detector is not described in detail. An image of the field of view to be scanned is formed in the plane of the detector by imaging and scanning optical system means 12 and is moved relative to the detector such that the detector consecutively scans virtually all points of the field of view. To this end the imaging and scanning optical system means 12 comprises movable optical elements. In detail the imaging and scanning optical system means 12 comprises rotating image deflecting means 14 for causing nutating movement of the image of the field of view at a rotary speed $n_1$. Furthermore the imaging and scanning optical system means 12 comprises image rotating means 16, which rotate about an axis of rotation 18 at a rotary speed $n_2$. These image rotating means 16 cause the image of the field of view to rotate at this rotary speed $n_2$. Eventually the imaging and scanning opticl system means 12 comprises an imaging optical system 20 separate from the image deflecting means 14 and image rotating means 16 for forming an image of the field of view.

The mode of operation of such a device can be gathered from FIG. 2. This figure illustrates the scanning of a circular field of view 22 by means of a device of the type described hereinbefore. Reversing the path of rays, the detector can be assumed to be imaged by the imaging and scanning optical system means 12 t infinity in the field of view to be scanned. Thus, the imaging and scanning optical system means form a detector image 10' of the detector 10. This detector image would move relative to the field of view. The image deflecting means cause nutating movement of the image of the field of view relative to the detector 10 or, in FIG. 2, nutating movement of an image 18' of the axis of rotation 18 along a circle 24. Correspondingly the detector image 10' makes also a nutating movement. Because of the image rotating means, there is a superposed rotation of the image of the field of view about the axis of rotation 18. In FIG. 2 the detector image 10' rotates about the image 18' of the axis of rotation 18. With the image deflecting means at rest, an annular area 26 around the image 18' of the axis of rotation 18 would be scanned by the detector 10 during each half revolution of the image rotating means. Actually, however, the rotation of the image and the nutating movement are superposed. It can be ensured that, for example, with one single revolution of the image deflecting means 14 and correspondingly a plurality of revolutions of the image rotating means 16 the field of view 22 is scanned with sufficient resolution. In order to permit the field of view 22 to be scanned down to its center, the radius $r_1$ of the nutating movement caused by the image deflecting means 14, in the image plane, for example the radius of circle 24, is equal to the distance $r_2$ of the radially outermost point of the detector 10 from the axis of rotation 18. In FIG. 2 the images $r_1$, $r_2$ of these radii in the plane of the field of view 22 are illustrated.

Figure 3:
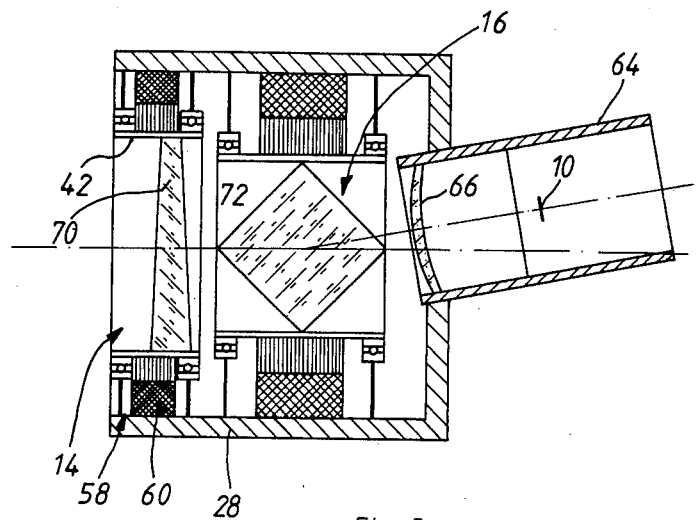
FIG. 3 is a longitudinal sectional view of a first embodiment of a device for scanning a field of view.
Figure 4:
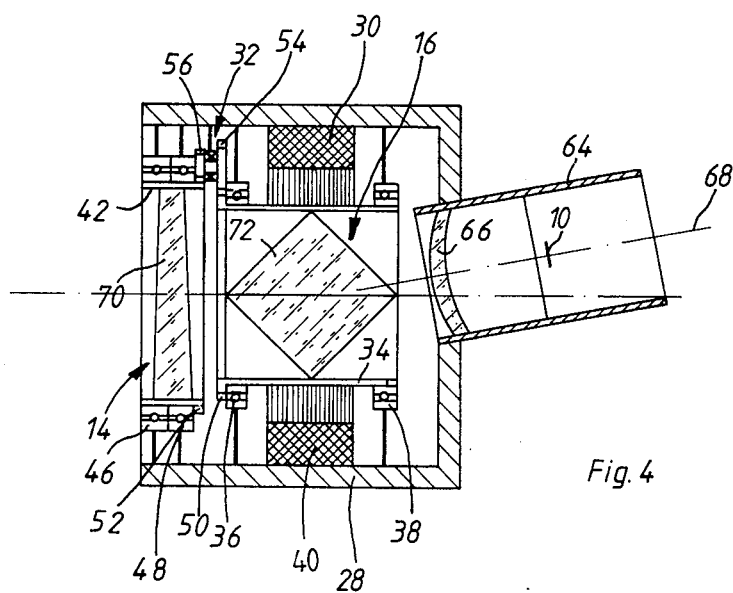
FIG. 4 is a longitudinal sectional view of a second embodiment of such a device.

In the embodiments of FIG. 3 and FIG. 4, the image deflecting means 14 and the image rotating means 16 are mounted for rotation about a common axis in a housing 28. In the embodiment of FIG. 4 one of the image deflecting means 14 and image rotating means 16, namely the image rotating means 16, is driven by a driving motor 30, and the other one, namely the image deflecting means 14 is coupled with the image rotating means 16 through a transmission 32. The image rotating means 16 are held in a mount 34 which is rotatably mounted in the housing 26 through bearing 36,38. The mount 34 carries the rotor of the driving motor 30, the stator 40 of which is supported in the housing 28 and annularly surrounds the mount 34. The image deflecting means 14 are held in a mount 42. The mount 42 is rotatably mounted in the housing through bearings 46,48. The image rotating means 16 and the image deflecting means 14 have gear rings 50 and 52, respectively, at their ends facing each other. A pair of interconnected pinions 54 and 56 is rotatably mounted in the housing 28, pinion 54 meshing with gear ring 50 of the image rotating means 16 and pinion 56 meshing with gear ring 52 of the image deflecting means 14.

In FIG. 3 corresponding elements are designated by the same reference numerals as in FIG. 4. Also here, the imaging deflecting means 14 are held in a mount 42 which is rotatably mounted in the housing 28. Here mount 42 carries the rotor of a second driving motor 58, the stator 60 of which is supported in the housing 28 and annularly surrounds the mount 42. Thus the image rotating means 16 and the image deflecting means 14 are each driven by a separate driving motor 30 and 58, respectively, independently of each other.

In both cases the rotary movements of the image deflecting means 14 and of the image rotating means 16 are detected by angle sensors (not shown). From the two angles of rotation the coordinates of the respective detected point of the field of view can be determined for each detector element.

The optical imaging system comprises a tube 64 with a lens objective 66 the optical axis 68 of which forms an angle with the axis of rotation 18. The tube 64 is attached to the housing 28.

The rotating, image deflecting means 14 is an optically refracting wedge 70. The image rotating means are a double Dove prism 72.

The arrangements described can be modified in various ways.

The image deflecting means 144 can be of the type which, by itself, causes a circular movement of the image of the field of view, while maintaining the orientation of the image of the field of view in space (nutating movement). However the image deflecting means 14 can also be of the type causing a circular movement in combination with a rotation. Instead of the optically refracting wedge or prism 70 also, for example, a Dove prism or an appropriate mirror system may be used as image deflecting means. Also in the image rotating means 16 the double Dove prism illustrated can be replaced by a single Dove prism or by a mirror system. Instead of the lens 66, also a catoptric system can be used as imaging optical system.

The sequence of the image deflecting means (DM), of the image rotating means (RM) and of the imaging optical system (IS) in the optical path of rays can be interchanged, if such means or system, respectively, are designed correspondingly. Thus the following arrangements are possible in addition to the illustrated one:

RM-DM-IS
DM-IS-RM
RM-IS-DM
IS-DM-RM
IS-RM-DM

If only a section of the total field of view is to be evaluated, the movement of the image deflecting means can be restricted to a limited angular range.

We claim:

1. Device for scanning a field of view by means of a detector (10) having a substantially linear array of detector elements, and of an imaging and scanning optical system means having movable optical elements, said optical system being adapted to form an image of the field of view in the plane of the detector (10) and to move said image relative to the detector, wherein
    (a) said imaging and scanning optical system means (12) comprises image rotating means (16) which rotate about an axis of rotation (18) at a first rotary speed ($n_2$) and which are adapted to rotate the image of the field of view at twice this first rotary speed, characterized in that
    (b) the imaging and scanning optical system means (12) comprises rotating, image deflecting means (14) for generating a nutating movement of the image of the field of view at a second rotary speed ($n_1$),
    (c) said detector (10) is arranged eccentric to said axis of rotation (18).

2. Device as claimed in claim 1, characterized in that said imaging and scanning optical system means (12) in addition to said image rotating means (16) and said image deflecting means (14) comprises a separate imaging optical system (20) for forming an image of the field of view.

3. Device as claimed in claim 1, characterized in that, in the image plane, the radius ($r_1$) of the nutating movement caused by said image deflecting means (14) is equal to the distance ($r_2$) of the radially outermost point of said detector (10) from said axis of rotation.

4. Device as claimed in claim 1, characterized in that said image rotating means (16) and said image deflecting means (14) are mounted in a housing (28) for rotation about a common axis.

5. Device as claimed in claim 4, characterized in that one of said image rotating and image deflecting means (16,14) is arranged to be driven by a driving motor (30), and the other one of said means is coupled with said one means through a transmission (32).

6. Device as claimed in claim 4, characterized in that said image rotating means (16) and said image deflecting means (14) are arranged to be driven independently of each other by first and second driving motors (30,58) respectively.

7. Device as claimed in claim 5, characterized in that
 (a) said image rotating means (16) are held in a mount (34) which is rotatably mounted in said housing (28), and
 (b) said mount (34) carries the rotor of said driving motor (30), the stator (40) of which is supported in said housing and annularly surrounds said mount.

8. Device as claimed in claim 7, characterized in that
 (a) said image deflecting means (14) are held in a mount (42) which is rotatably mounted in said housing (28),
 (b) said mounts (34,42) of said image rotating means and of said image deflecting means (16,14) having gear rings (50,52) at their ends facing each other, and
 (c) a pair of interconnected pinions (54,56) is rotatably mounted in said housing and mesh with one of these gear rings (50,52) each.

9. Device as claimed in claim 6, characterized in that
 (a) said image rotating means (16) are held in a first mount (34) which is rotatably mounted in said housing (28),
 (b) said first mount (34) carries the rotor of said first driving motor (30) the stator (40) of which is supported in said housing (28) and annularly surrounds said first mount (34),
 (c) said image deflecting means (14) are held in a second mount (42) which is rotatably mounted in said housing (28), and
 (d) said second mount (42) carries the rotor of said second driving motor (58) the stator (60) of which is supported in said housing (28) and annularly surrounds said second mount (42).

10. Device as claimed in claim 4, characterized in that the rotating image deflecting means (14) is an optically refracting wedge (70).

11. Device as claimed in claim 4, characterized in that the image rotating means (16) is a rotating Dove prism (72).

* * * * *

UNITED STATES PATENT AND TRADEMARK OFFICE
CERTIFICATE OF CORRECTION

PATENT NO. : 4,717,823
DATED : January 5, 1988
INVENTOR(S) : Johnannes Steimel et al.

It is certified that error appears in the above-identified patent and that said Letters Patent are hereby corrected as shown below:

At Col. 1, line 22, please delete the word "scn" and insert therefor the word — scan — .

At Col. 2, last line, after the number "12", delete the letter "t" and insert therefor the word — at — .

At Col. 4, line 12, please delete the number "144" and insert therefor the number — 14 — .

Signed and Sealed this

Tenth Day of May, 1988

*Attest:*

DONALD J. QUIGG

*Attesting Officer*   *Commissioner of Patents and Trademarks*